United States Patent [19]

Asano et al.

[11] Patent Number: 5,061,883
[45] Date of Patent: Oct. 29, 1991

[54] BRAKING SYSTEM FOR ELECTRIC RAILCARS INCLUDING MEANS FOR CONTROLLING ELECTRIC BRAKE FORCE

[75] Inventors: Yumiko Asano; Hideo Obi; Shigeya Ohhama, all of Amagasaki, Japan

[73] Assignee: Mitsubishi Denki Kabushiki Kaisha, Japan

[21] Appl. No.: 379,213

[22] Filed: Jul. 13, 1989

[30] Foreign Application Priority Data

Sep. 8, 1988 [JP] Japan ................. 63-225382

[51] Int. Cl.[5] ............................. H02P 3/00
[52] U.S. Cl. .................... 318/362; 318/371
[58] Field of Search .......... 318/51, 52, 56, 60, 318/63, 68, 362, 365, 369–372, 374, 375, 376, 86, 139, 364

[56] References Cited

U.S. PATENT DOCUMENTS

| | | | |
|---|---|---|---|
| 3,334,287 | 8/1967 | Jensen | 318/372 |
| 3,621,729 | 11/1971 | Oberthur | 318/371 X |
| 3,774,095 | 11/1973 | Coccia | 318/371 |
| 4,087,078 | 5/1978 | Jorakv et al. | 318/374 X |
| 4,225,813 | 9/1980 | Sahasrabudhe | 318/371 |
| 4,340,131 | 7/1982 | Eriksson | 318/371 X |
| 4,417,288 | 11/1983 | Hattori et al. | 318/371 X |
| 4,651,071 | 3/1987 | Imanaka | 318/371 |
| 4,659,970 | 4/1987 | Melocik | 318/371 X |
| 4,779,260 | 10/1988 | Kaneko et al. | 318/373 X |

OTHER PUBLICATIONS

"Japanese National Symposium Theses Utilizing Cybernetics for Railways", Feb. 1988, pp. 347–351.

Primary Examiner—William M. Shoop, Jr.
Assistant Examiner—A. Jonathan Wysocki
Attorney, Agent, or Firm—Leydig, Voit & Mayer

[57] ABSTRACT

A braking system for an electric railcar having an a.c. motor with a variable voltage variable frequency inverter. The inverter controls the voltage and frequency supplied to the a.c. motor in response to the railcar speed, commands from the cab, load conditions, etc. The braking system also includes a pneumatic brake which operates at low speeds. A control circuit operates the inverter to supply electric braking down to a slow speed and then simultaneously applies electric braking and pneumatic braking, smoothly increasing the pneumatic braking force until the railcar stops. During the transistion from electric braking to pneumatic braking the control circuit maintains an output frequency from the inverter to the a.c. motor in the vicinity of 0 Hz, keeping the voltages in the positive phase range.

5 Claims, 2 Drawing Sheets

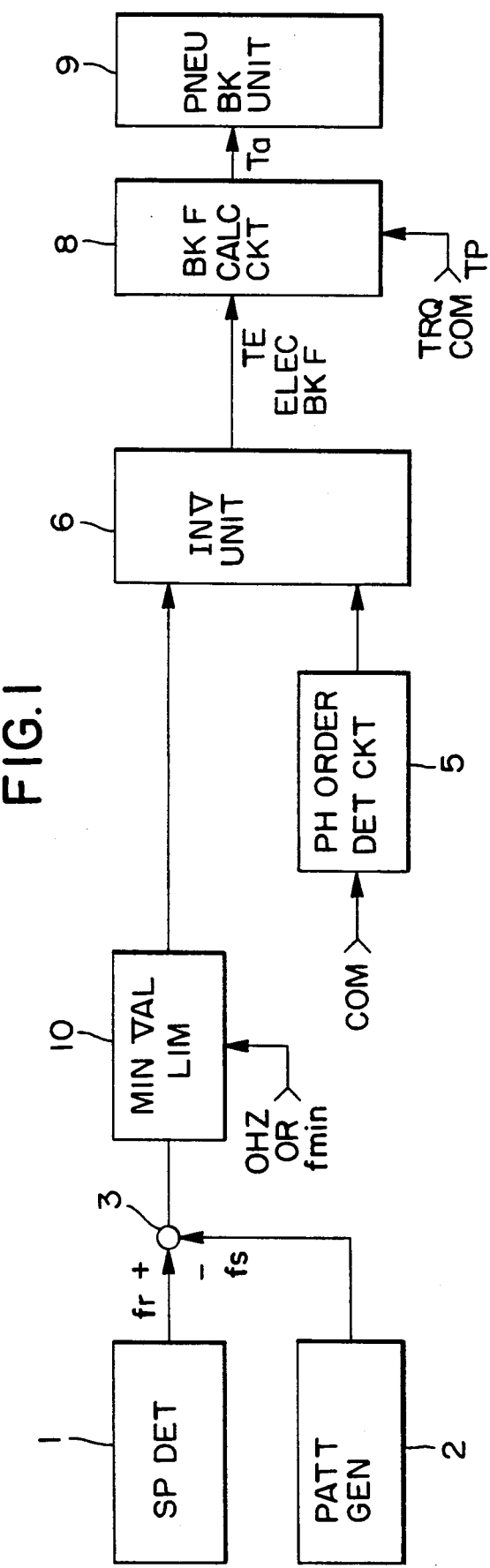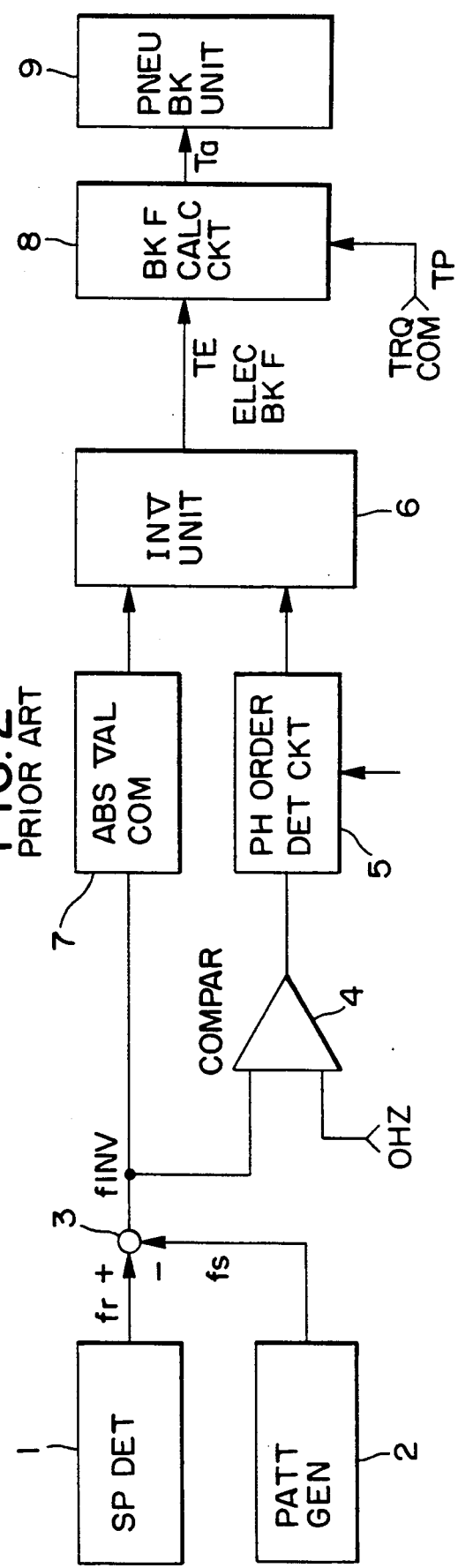

BRAKING SYSTEM FOR ELECTRIC RAILCARS INCLUDING MEANS FOR CONTROLLING ELECTRIC BRAKE FORCE

BACKGROUND OF THE INVENTION

The present invention relates to a braking system for electric railcars operating near the stopping speed of the electric railcar.

Generally, to minimize required maintenance it is desirable to slow an electric railcar using an electric brake (ideally to a stop). Further, to simplify and save energy, it is advantageous to conduct electric braking using a regenerative braking system.

However, in order to complete stopping in a prior-art electric railcar, denoted at 12 in FIG. 13 the brake system is switched to pneumatic braking at about 5 km/hr., denoted at 11 in FIG. 3. Further, to achieve the same stopping distance, the brake system employs a switching system which decreases regenerative braking from about 10 km/hr in order to match the response time of the pneumatic brake.

In order to increase the electric braking range of a non-adhesion drive when the electric motor employs a linear motor, devoted by 10 in FIG. 3 the brake system employs a system for raising the inverter frequency by switching the phase order of the inverter at 0 Hz to a reverse phase range thereby applying a braking force of 100% by the electric brake until the railcar has stopped.

FIG. 2 is a block diagram showing, for example, speed control during braking of a linear motor electric railcar disclosed on pages 347 to 351 of "24th Domestic Symposium Theses Utilizing Cybernetics in Railway" (issued by Japan Railway Cybernetics Council in February, 1988).

In the drawing, a speed detector 1 is attached to the end of an axle or the like for detecting the speed of a linear motor electric railcar. A pattern generator 2 generates various types of control patterns in response to a command given from a drive cab or the like and outputs a slip frequency pattern $f_s$ in a speed control range. A frequency arithmetic unit 3 subtracts the slip frequency pattern $f_s$ outputted by the pattern generator 2 from a speed (rotor frequency) $f_r$ outputted by the speed detector 1 and outputs an inverter frequency $f_{INV}$. A comparator 4 compares the inverter frequency $f_{INV}$ with a phase order switching reference frequency of 0 Hz. A phase order determining circuit 5 and an absolute value comparing circuit 7 output to an inverter unit 6 a rotating direction command from the comparator 4. A braking force computing circuit 8, given a torque command from a driver cab or the like and a generated electric braking force $T_E$ from the inverter unit 6, outputs a signal of insufficiency. A pneumatic braking unit 9 applies a pneumatic braking force in response to the output of the braking force computing circuit 8.

Next, the operation or the prior-art linear motor electric railcar will be explained. The pattern generator 2 generates a slip frequency pattern $f_s$ according to a command from the driver cab, load conditions or the like. The frequency arithmetic unit 3 subtracts the slip frequency pattern $f_s$ from the speed (rotor frequency) $f_r$ detected by the speed detector 1 during braking as shown in an equation (1), and outputs and inverter frequency command value $f_{INV}$.

$$f_{INV} = f_r - f_s \tag{1}$$

The fINV signal is applied through the absolute value computing circuit 7 to the inverter unit 6. When the railcar is decelerated to nearly a stop, the $f_r$ in equation (1) is reduced, and there is a point at which the $f_{INV}$ becomes less than "0". In other words, there is a range the frequency $f_{INV}$ changes in sign from positive to negative. Then, a braking force is obtained by consuming energy at the secondary side of the electric motor by forming a magnetic field of a reverse phase of the rotating direction (advancing direction) of the electric motor. Therefore, it is necessary to replace the phase order of the output of the inverter so as to form the magnetic field of the reverse phase.

The comparator 4 compares the 0 Hz of the reference frequency with the output $f_{INV}$ of the frequency arithmetic unit 3, and outputs a phase order switching command to the phase order determining circuit 5 when the condition (2) below is met.

$$f_{INV} \leq 0 \tag{2}$$

The phase order determining circuit 5 combines the rotating direction command and the output from the comparator 4, and determines the output phase order of the inverter and outputs it to the inverter unit 6.

As described above, the inverter frequency command value $|f_{INV}|$ and the inverter output phase order are applied as speed control commands to the inverter unit 6, thereby controlling the speed of the electric motor.

On the other hand, the inverter unit 6 outputs a generated electric braking force $T_E$ to the braking force computing circuit 8. The braking force computing circuit 8 computes the insufficiency of the torque command $T_p$ applied from the driver cab or the like by the following equation (3), and outputs a command $T_a$ to the pneumatic braking unit.

$$T_a = T_p - T_E \tag{3}$$

The pneumatic braking unit thus applied the braking force obtained by the equation (3) so that the deceleration of the railcar becomes the desired value. However, since the pneumatic braking unit 9 needs a response time, the equation (3) cannot be instantly satisfied.

Since the prior-art braking system for the electric railcar is controlled as described above, the approximate speed of 0 km/hr cannot be detected due to the inaccuracy of the detector. Thus, there is a possibility that the electric railcar might be reversely driven due to the negative frequency. Further, since the output frequency of the inverter cannot be set completely to 0 Hz at the time of switching the phase order, there are variations in the frequency near 0 Hz, causing variations in the torque which drop the deceleration of the railcar. Thus, there are problems, such as failure in the riding comfort of the railcar.

SUMMARY OF THE INVENTION

The present invention has been made in view of the disadvantages described above, and has for its object to provide a braking system for an electric railcar, which can be smoothly switched to a pneumatic brake while an electric brake is operating immediately before the stop of the electric railcar.

The braking system for an electric railcar according to the present invention fixes the output frequency of an inverter "0" Hz or a minimum frequency which can be generated while holding it in a positive phase range during braking of the electric railcar at the time of stopping.

In the braking system for the electric railcar according to the present invention, the output frequency of the inverter is continuously varied while operating the electric brake immediately before stopping of the electric railcar. Therefore, the electric railcar can be switched smoothly to the pneumatic brake without generating the variations in the torque, thereby completely stopping the electric railcar.

DESCRIPTION OF THE DRAWINGS

FIG. 1 is a block diagram showing an embodiment of a braking system for an electric railcar according to the present invention; and FIG. 2 is a block diagram showing a prior-art braking system for an electric railcar.

In the drawings, the same symbols indicate the same or corresponding parts.

DESCRIPTION OF THE PREFERRED EMBODIMENTS

Figure 3:
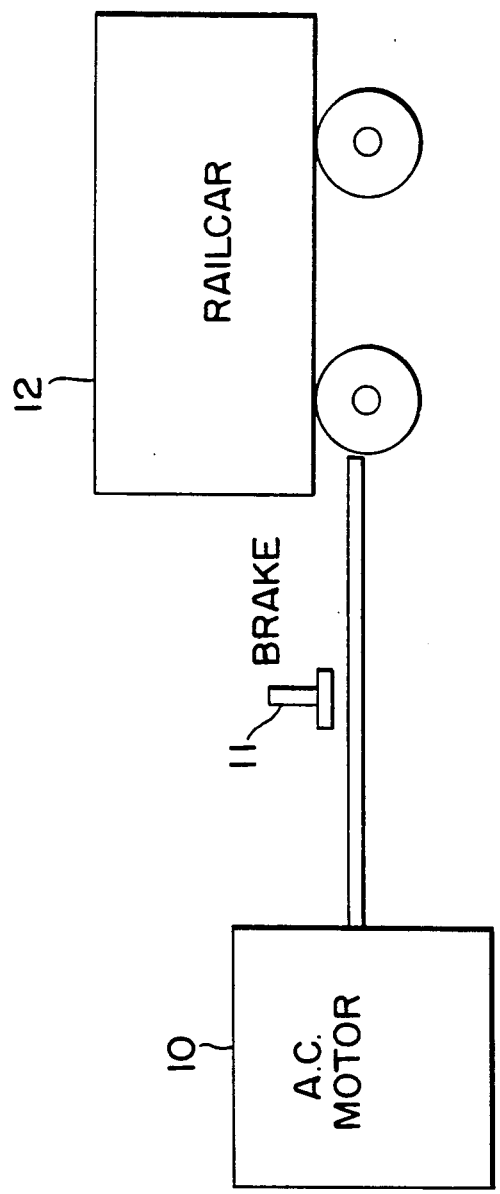
FIG. 3 is a schematic diagram showing a railcar driven by an A.C. motor.

An embodiment of the present invention will be described with reference to the drawing. In FIG. 1, elements 1 to 3, 5, 6, 8 and 9 are the same as those in the prior-art braking system for the electric railcar in FIG. 2. A minimum value limiter 10 limits the output frequency $f_{INV}$ of a frequency arithmetic unit 3 to 0 Hz or a minimum frequency $f_{min}$ and outputs a frequency of 0 Hz or $f_{min}$ or more to an inverter unit 6.

Next, the operation of the braking system for an electric railcar will be explained. In FIG. 1, a pattern generator 2 generates a slip frequency pattern $f_s$ according to a command from a driver cab or the like, load conditions, etc. at the time of braking. The frequency arithmetic unit 3 subtracts the slip frequency pattern $f_s$ from the speed (rotor frequency) $f_r$ detected by a speed detector 1 at the time of braking, thereby outputting an inverter frequency command value $f_{INV}$ represented by the following equation (4).

$$f_{INV} = f_r - f_s \quad (4)$$

When the railcar is decelerated to nearly a stop, the $f_r$ in equation (4) decreases, and there is a point at which the $f_{INV}$ becomes less than "0". Then, the output of the inverter unit 6 is limited to 0 Hz or a minimum frequency $f_{min}$ which can be generated by the minimum value limiter 10.

The inverter unit 6 outputs a generated electric brake force $T_E$ to a braking force computing circuit 8. The braking force computing circuit 8 computes the insufficiency for the torque command $T_p$ applied from the driver cab or the like by the following equation (5), and outputs a command $T_a$ to the pneumatic braking unit 9.

$$T_a = T_p - T_E \quad (5)$$

The pneumatic braking unit 9 thus applies a braking force obtained by the equation (5) so that the deceleration of the railcar becomes the desired. As the railcar is decelerated, the $f_r$ decreases.

Therefore, if the $f_{INV}$ is constant at approximately 0 Hz, the real slip frequency $f_s$ is reduced to the same absolute value as that of the $f_r$. As the slip frequency is reduced, the torque is then decreased, thereby reducing the electric braking force of the electric railcar. Simultaneously, its pneumatic braking force is raised so as to supplement it, and the railcar is smoothly switched from electric braking to pneumatic braking.

In this case, since the decrease in the electric braking force is smoothly conducted, the response of the pneumatic braking is sufficiently in time.

Further, since the $f_{INV}$ is fixed if the speed of the railcar is a speed corresponding to $f_{INV}=0$ (or $f_{INV}=f_{min}$) or less, it is not necessary to detect the complete stop of the railcar. Moreover, since the pneumatic braking force is raised to 100% at the time of a complete stop of the electric railcar, there is no possibility for the railcar to be reversely driven. Further, the electric braking force can be utilized to the limit of the positive phase of the inverter.

In the embodiment described above, the a.c. electric motor employs a linear motor. However, even if the a.c. electric motor employs a rotary type motor, the same advantages as those in the embodiment may be achieved.

According to the present invention as described above, the output frequency of the inverter unit is fixed at 0 Hz or a minimum frequency which can be generated at approximately the stopping speed of the electric railcar. Therefore, the real slip frequency is reduced by the same absolute value as that of the rotor frequency $f_r$, and the electric braking force is smoothly switched to the pneumatic braking force as the electric braking is decreased.

What is claimed is:

1. A braking system for an electric railcar having an a.c. motor for driving the electric railcar including:
    an arithmetic unit receiving as input a slip frequency and a rotor frequency and generating an output representing the difference between the slip and rotor frequencies, which difference may be positive or negative in sign;
    a variable voltage variable frequency inverter unit connected to the arithmetic unit to receive the output therefrom, for outputting an electric brake force command and controlling the speed of the a.c. motor;
    a mechanical brake unit for braking the electric railcar; and
    limiter means connected between said inverter unit and said arithmetic unit for limiting the output frequency of said inverter unit to a minimum frequency in the vicinity of 0 Hz regardless of the sign of the arithmetic unit output thereby to achieve a stopping of the electric railcar.

2. A braking system for an electric railcar having an a.c. motor for driving the railcar including:
    a variable voltage variable frequency inverter unit operably connected to reduce the frequency and voltage supplied to the a.c. motor from movement producing values to apply regenerative electric braking force and decelerate movement of the railcar,
    a pneumatic brake which applies a pneumatic braking force to decelerate movement of the railcar,
    means for increasing the applied pneumatic braking force according to the deceleration of said railcar so that pneumatic braking force and electric braking force are simultaneously applied, and
    control means for limiting the minimum frequency which is applied to the a.c. motor by said inverter unit to the vicinity of 0 Hz while holding the voltage in a positive phase range thereby decreasing the electric braking force and obtaining a smooth transition to an increasing pneumatic braking force for stopping movement of the railcar.

3. A braking system according to claim 2 including a speed detector connected to supply a railcar speed representing signal to said control means.

4. A braking system according to claim 3 including a pattern generator connected to supply a desired slip frequency to said control means.

5. A braking system for an electric railcar having an a.c. motor for driving the railcar including:

an arithmetic unit receiving as input a slip frequency and a rotor frequency and generating an output representing the difference between the slip and rotor frequencies, which difference may be positive or negative in sign;

a variable voltage variable frequency inverter unit operably connected to the arithmetic unit to receive the output therefrom and reduce the frequency and voltage supplied to the a.c. motor from movement producing values to apply regenerative electric braking force and decelerate movement of the railcar;

a pneumatic brake which applies a pneumatic braking force to decelerate movement of the railcar;

means for increasing the applied pneumatic braking force according to the deceleration of said railcar so that pneumatic braking force and electric braking force are simultaneously applied; and control means for limiting the minimum frequency applied to the a.c. motor by said inverter unit to the vicinity of 0 Hz, regardless of the sign of the arithmetic unit output, while holding the voltage in a positive phase range thereby decreasing the electric braking force and obtaining a smooth transition to an increasing pneumatic braking force for stopping movement of the railcar.

* * * * *